(12) United States Patent
Dietrich et al.

(10) Patent No.: US 8,786,450 B2
(45) Date of Patent: Jul. 22, 2014

(54) METHOD FOR IDENTIFYING DIRT AND/OR DEW ON COMPONENTS OF A VOLTAGE INTERMEDIATE CIRCUIT CONVERTER

(75) Inventors: Christian Dietrich, Augsburg (DE); Werner Fischer, Heilsbronn (DE); Jörg Hassel, Erlangen (DE); Marc Hiller, Lauf an der Pegnitz (DE); Carsten Probol, Buckenhof (DE); Rainer Sommer, Heroldsbach (DE)

(73) Assignee: Siemens Aktiengesellschaft, München (DE)

( * ) Notice: Subject to any disclaimer, the term of this patent is extended or adjusted under 35 U.S.C. 154(b) by 78 days.

(21) Appl. No.: 13/320,326

(22) PCT Filed: Jan. 29, 2010

(86) PCT No.: PCT/EP2010/051109
§ 371 (c)(1),
(2), (4) Date: Jan. 20, 2012

(87) PCT Pub. No.: WO2010/130470
PCT Pub. Date: Nov. 18, 2010

(65) Prior Publication Data
US 2012/0105235 A1  May 3, 2012

(30) Foreign Application Priority Data
May 14, 2009  (DE) .......................... 10 2009 021 238

(51) Int. Cl.
*G08B 21/00*  (2006.01)

(52) U.S. Cl.
USPC .................... 340/604; 340/636.12; 340/648

(58) Field of Classification Search
USPC ............... 340/604, 605, 612, 614, 616–620, 340/636.11, 636.12, 636.13, 636.15, 340/636.17, 645–648
See application file for complete search history.

(56) References Cited

U.S. PATENT DOCUMENTS

| | | | |
|---|---|---|---|
| 4,063,168 A | 12/1977 | Franke | |
| 6,243,405 B1 * | 6/2001 | Borneis et al. | 372/57 |
| 6,300,767 B1 * | 10/2001 | Kliman et al. | 324/536 |
| 7,622,886 B2 * | 11/2009 | Schierling | 318/807 |
| 8,271,213 B2 | 9/2012 | Xu et al. | |
| 2002/0006335 A1 * | 1/2002 | Rohner | 417/53 |
| 2002/0090735 A1 * | 7/2002 | Kishkovich et al. | 436/111 |
| 2008/0084215 A1 * | 4/2008 | Itten et al. | 324/510 |

FOREIGN PATENT DOCUMENTS

| | | |
|---|---|---|
| CN | 1553207 A | 12/2004 |
| CN | 2697662 Y | 5/2005 |
| CN | 101086515 A | 12/2007 |
| DE | 102004018578 B4 | 2/2007 |

(Continued)

*Primary Examiner* — Daniel Previl

(74) *Attorney, Agent, or Firm* — Henry M Feiereisen LLC

(57) ABSTRACT

The invention relates to a method for identifying dirt and/or dew on components of a voltage intermediate circuit converter. According to the invention, the temporal curve of a partial discharge pulsed current is detected at least during a precharging process of an intermediate circuit capacitor of the voltage intermediate circuit converter comprising at least one capacitor, wherein a frequency spectrum is calculated from said current pulse, and wherein depending of the result, a dirt warning and/or a dew warning is activated. Thus, the degree of dirt and/or dew of said voltage intermediate circuit converter can be determined at least during a charging process of an intermediate circuit capacitor of a voltage intermediate circuit converter, thereby preventing a breakdown including the consequences thereof.

4 Claims, 1 Drawing Sheet

(56) References Cited

FOREIGN PATENT DOCUMENTS

| DE | 102007023056 A1 | 8/2008 |
| EP | 1909369 A2 | 4/2008 |
| JP | 6331684 A | 12/1994 |
| WO | WO 9303530 A1 | 2/1993 |
| WO | WO 2005101431 A1 | 10/2005 |
| WO | WO 2007093861 A2 | 8/2007 |

* cited by examiner

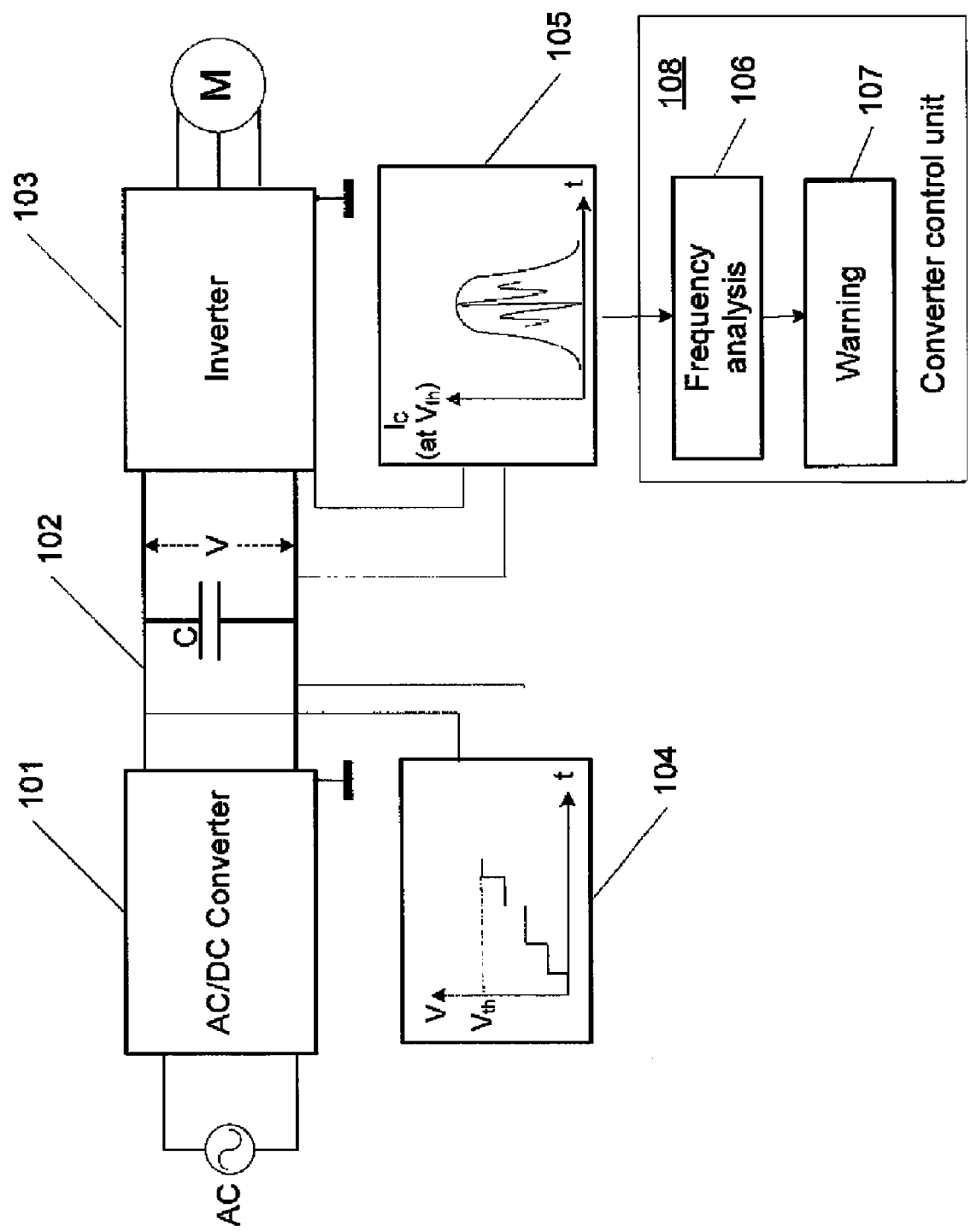

METHOD FOR IDENTIFYING DIRT AND/OR DEW ON COMPONENTS OF A VOLTAGE INTERMEDIATE CIRCUIT CONVERTER

CROSS-REFERENCES TO RELATED APPLICATIONS

This application is the U.S. National Stage of International Application No. PCT/EP2010/051109, filed Jan. 29, 2010, which designated the United States and has been published as International Publication No. WO 2010/130470 and which claims the priority of German Patent Application, Serial No. 10 2009 021 238.8, filed May 14, 2009, pursuant to 35 U.S.C. 119(a)-(d).

BACKGROUND OF THE INVENTION

The invention relates to a method for identifying contamination and/or condensation on components of a voltage intermediate circuit converter.

In converters, in particular voltage intermediate circuit converters, operation where condensation or unacceptable contamination is present leads to flashover which damages or destroys the converter.

By means of a correspondingly robust design, for example by means of air gaps and creep gaps of a sufficient size and/or a high protection grade, attempts are made to reduce the sensitivity to operation in the presence of condensation and/or contamination. Operation where condensation and/or contamination is present is incorrect operation, which is normally not permitted. Instructions in documentation for the converter (operating instructions, commissioning instructions, handbook) are intended to ensure that a converter is only used in the correct manner. In other words, it is not possible for incorrect operation to take place.

When circumstances are present for a converter to be damaged or destroyed, it is assumed that the instructions for use have not been adhered to. In other words, the damaged or destroyed converter has not been used in the correct manner.

A method for detecting the degree of contamination on an operational converter device is known from DE 10 2004 018 578 B4. According to this method, a surface conductance of a part of the converter device which is subjected to the ambient air around the converter device is determined and compared with a predetermined limit value. This determined comparison value is a measurement of the degree of contamination on the converter device. By means of this method, even before the operation is interrupted, the risk is identified of protective shutdown of the converter device as a result of the contamination. Such contamination on the converter device occurs precisely when said converter device is not operated according to its protection grade.

A method for protecting a device to be cooled from condensation is disclosed in DE 10 2007 023 056 A1. According to this method, depending on a determined temperature of a cooling device of the device to be cooled, a determined coolant inlet temperature and a predetermined temperature of the air surrounding the device to be cooled, an adjusting signal is generated, by which the coolant volumetric flow is adjusted such that the temperature of the cooling device is the same as the ambient air. As a result, in the region of the cooling device a liquid phase of the air is prevented from being omitted and condensation is prevented from being able to be formed on devices to be cooled of said region of the cooling device. Thus protection against condensation is achieved.

These known methods are implemented during operation of a converter, in particular a voltage intermediate circuit converter. As a result, these known methods are not able to protect a converter, which is intended to be operated again after a lengthy stoppage time, from flashover which results from condensation and/or unacceptable contamination.

The object of the invention, therefore, is to provide a method by which at least during a pre-charging process of an intermediate circuit capacitor of a voltage intermediate circuit converter the degree of contamination and/or condensation may be identified.

SUMMARY OF THE INVENTION

This object is achieved according to the invention by a method for identifying contamination and/or condensation on components of a voltage intermediate circuit converter, with the steps of measuring a temporal curve of a partial discharge pulsed current at least during a pre-charging process of an intermediate circuit capacitor of the voltage intermediate circuit converter which comprises at least one capacitor, computing a frequency spectrum for said pulsed current, and activating, depending on the computed frequency spectrum, at least one of a contamination warning and a condensation warning.

BRIEF DESCRIPTION OF THE DRAWING

FIG. 1 shows a schematic diagram of a converter with an intermediate circuit capacitor and examples of measured quantities according to the present invention.

DETAILED DESCRIPTION OF PREFERRED EMBODIMENTS

As the temporal curve of a partial discharge pulsed current is detected at least during the pre-charging process of an intermediate circuit capacitor of a voltage intermediate circuit converter comprising at least one capacitor, the frequency spectrum thereof being calculated and evaluated, conclusions may be drawn about the type of contamination or condensation. The result is displayed in the form of an appropriate warning. It is possible that the pre-charging process is terminated.

This method according to the invention exploits the fact that in converters having an AC/DC converter 101, a DC voltage intermediate circuit 102, and an inverter 103, as illustrated in FIG. 1, when switching on said AC/DC converter, the intermediate circuit DC voltage V is slowly built up on the intermediate circuit capacitor C which comprises at least one capacitor. This serves, amongst other things, to protect associated components and to limit the switch-on current. Contamination and/or condensation which would lead to breakdown at full intermediate circuit DC voltage, however, only results in partial discharge at sufficiently low voltage. This partial discharge is identified and evaluated according to the invention by means of partial discharge measuring techniques.

As a period of several minutes may pass between the application of an intermediate circuit voltage during a pre-charging process and the occurrence of a partial discharge, it is expedient to detect and evaluate the temporal curve of a partial discharge pulsed current, even during the operation of a converter following the pre-charging process. This detection of the temporal curve of a partial discharge pulsed current may be restricted to a few minutes, for example ten minutes. However, it is also possible to permit the detection of the temporal curve of a partial discharge pulsed current during the entire operation of the converter.

A warning that contamination and/or condensation is present is intended to indicate that a further increase in voltage could lead to breakdown. Using the temporal curve and the frequency spectrum associated therewith, conclusions may be drawn about the type of contamination and/or condensation.

The temporal curve is detected of a partial discharge pulsed current at a voltage in the DC voltage intermediate circuit of the voltage intermediate circuit converter which would not yet lead to breakdown. For example, the temporal curve of a partial discharge pulsed current is detected at a voltage amplitude V which corresponds to at least 60% or more of the nominal DC voltage. It is possible, however, for this value to have already led to breakdown. In order to detect the voltage limit which leads to breakdown, the intermediate circuit capacitor is charged in a stepwise manner, as shown in box 104 of FIG. 1.

With this stepwise increase in the intermediate circuit voltage V, partial discharge occurs from a specific voltage which is also denoted as the partial discharge threshold voltage $V_{th}$, said partial discharge being caused by contamination with simultaneous occurrence of condensate, for example across the insulation of an intermediate circuit busbar of the converter.

During partial discharge, a pulse-shaped compensating current $I_C$ flows, for example, from a mass electrode to the converter mass. Said pulse-shaped compensating current is measured by means of a measurement sensor, for example a Rogowski coil, as shown in box 105 of FIG. 1. A partial discharge is inferred from the characteristic pulse shape by computing a corresponding frequency spectrum of the pulse-shaped compensating current, as indicated by the oscillatory signal within the pulse in box 105, the frequency of occurrence and the temporal association with an intermediate circuit voltage of the converter.

As the converter control unit controls the charging process of the voltage intermediate circuit of the converter, it is advantageous that said converter also carries out the analysis of the current pulse. For this reason, the partial discharge sensor forwards its signal to the control unit 108 of the converter where the frequency analysis then takes place, as shown in box 106 of FIG. 1. In addition, a warning which is to be displayed is selected in this converter control unit, as shown in box 107 of FIG. 1.

During a pre-charging process of an intermediate circuit capacitor of a voltage intermediate circuit converter comprising at least one capacitor, a level of contamination and/or condensation may be determined by means of this method according to the invention so that said contamination and/or condensation no longer leads to flashover, with the consequences thereof.

What is claimed is:

1. A method for identifying contamination and/or condensation on components of a voltage intermediate circuit converter, comprising the steps of:
    pre-charging an intermediate circuit capacitor of the voltage intermediate circuit converter, which comprises at least one capacitor, with a stepwise increasing voltage,
    measuring a temporal curve of a partial discharge pulsed current at each voltage step of the stepwise increasing voltage,
    computing a frequency spectrum for said pulsed current, and
    activating, depending on the computed frequency spectrum, at least one of a contamination warning and a condensation warning.

2. The method of claim 1, wherein the temporal curve of the partial discharge pulsed current is measured during operation of the converter following pre-charging.

3. The method of claim 1, wherein the temporal curve of the partial discharge pulsed current is measured when an intermediate circuit voltage of the voltage intermediate circuit converter is at at least 60% or more of a nominal intermediate circuit voltage of the voltage intermediate circuit converter.

4. The method of claim 1, wherein the pre-charging process is terminated, depending on the computed frequency spectrum.

* * * * *